Oct. 6, 1959 E. R. PIERCE 2,907,425
FRICTION CLUTCH
Filed Nov. 18, 1953 3 Sheets-Sheet 3

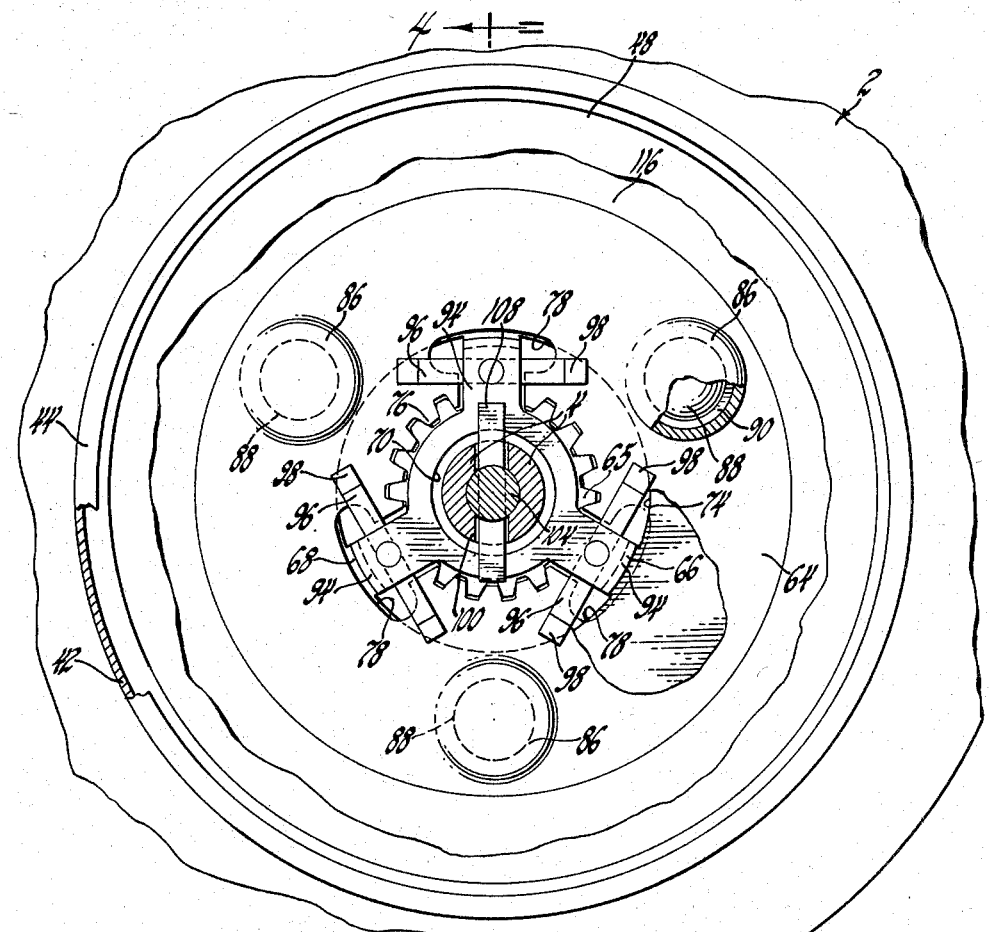

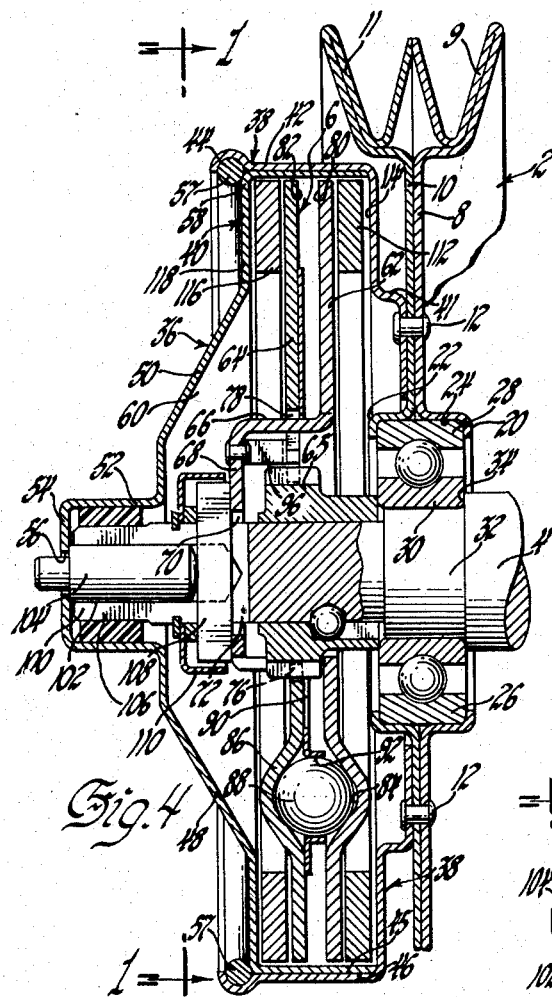

INVENTOR
Earl R. Pierce
BY C. F. Dibble
ATTORNEY

United States Patent Office 2,907,425
Patented Oct. 6, 1959

2,907,425

FRICTION CLUTCH

Earl R. Pierce, Birmingham, Mich., assignor to General Motors Corporation, Detroit, Mich., a corporation of Delaware Application November 18, 1953, Serial No. 392,951

6 Claims. (Cl. 192—32)

This invention relates to friction clutches and more particularly to self-energizing clutches having pressure responsive actuating means adapted for controlling transmission of power to auxiliary devices.

An object of the invention is to provide a clutch mechanism having pressure responsive self-energizing and releasing means.

Another object is to provide a clutch mechanism which is initially actuated by light manual pressure and thereafter is partially self-energizing.

Still another object is to provide a clutch mechanism having a plurality of pressure plates wherein clutch engagement is initially effected by pressure inducing light frictional drag on one of said plates, the clutch thereafter being self-energizing until release of said pressure.

A further object is to provide a clutch mechanism having self-energizing means whereby a very low manual clutch engaging pressure is required.

Yet another object is to provide a clutch of the type described wherein the manual actuating pressure and self-energizing effect are additive.

A still further object is to provide a device of the stated character wherein the various parts are adapted for construction from press formed sheet metal.

Yet a further object is to provide a centrifugally actuated self-energizing clutch.

A further object is to provide a device of the type described which is simple in construction, low in cost and efficient in operation.

These and other objects and advantages of the invention will be more clearly understood as reference is had to the accompanying specification and drawings wherein:

Fig. 1 is a fragmentary plan view, partly in section, of the clutch assembly, with portions broken away to show certain features of construction.

Fig. 2 is a fragmentary plan view of a portion of the assembly, looking in the direction of arrows 2—2 of Fig. 5.

Fig. 3 is a fragmentary sectional elevational view looking in the direction of arrows 3—3 of Fig. 2, showing in dotted lines the circumferential displacement of the clutch plates in an energizing position.

Fig. 4 is a sectional elevational view of the clutch assembly in released position, certain parts being broken away.

Fig. 4a is a fragmentary elevational view of a portion of one of the clutch pressure plates illustrating the form of the inner periphery thereof.

Fig. 5 is a fragmentary sectional elevational view similar to Fig. 4 showing the position of the parts when the clutch is operative.

Fig. 6 is a fragmentary sectional elevational view of a modification of the mechanism shown in Fig. 4.

Figure 7:
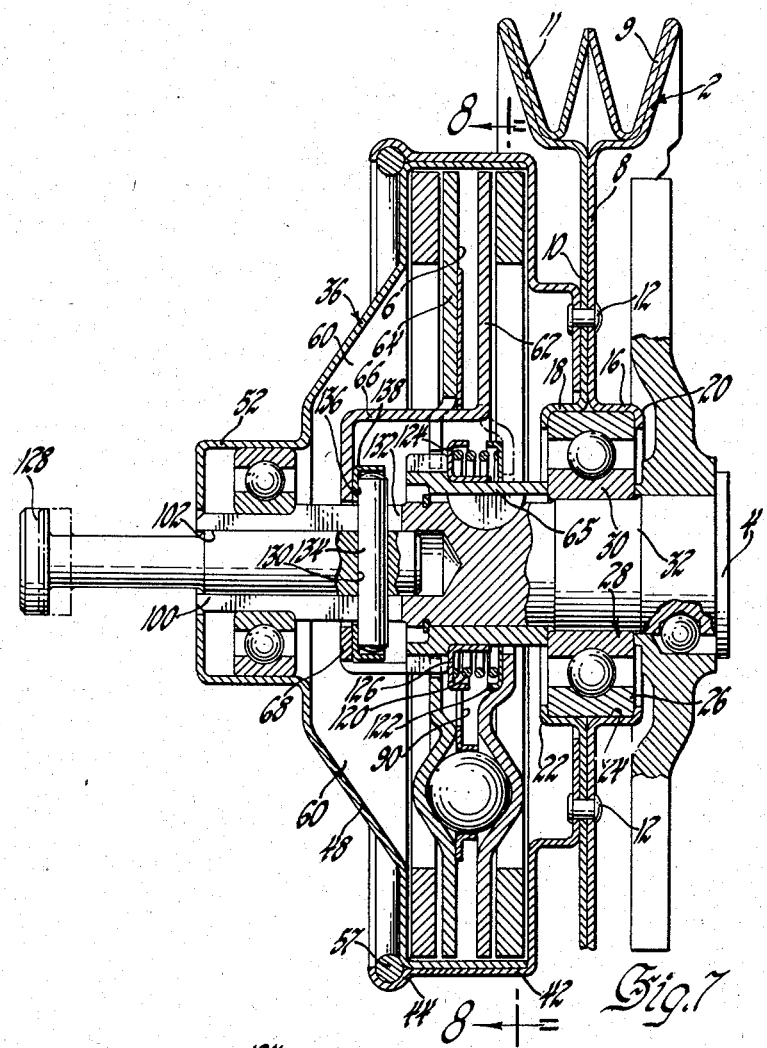
Fig. 7 is a sectional elevational view similar to Fig. 4, showing another modification of the invention.
Figure 8:
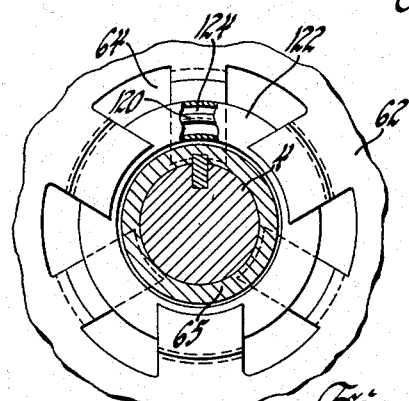
Fig. 8 is a fragmentary plan view looking in the direction of arrows 8—8 of Fig. 7, certain parts being broken away to more clearly illustrate the construction.

Referring now to the drawings and particularly Figs. 1 and 4, there is illustrated a friction clutch drive assembly comprising a driving pulley 2, a driven shaft 4 and a manually actuated self-energized clutch mechanism 6 adapted to effect driving engagement between pulley 2 and driven shaft 4. Driven shaft 4 is adapted to drive an auxiliary unit such as for instance, the compressor of a vehicle air conditioning system, not shown. Driving pulley 2 is constructed of press formed sheet metal members 8 and 10 which are reversely similar in configuration and are secured together in concentric opposed relation by means of rivets 12 or the like. At their outer periphery, members 8 and 10 are formed with axially abutting circumferential flanges 9 and 11 of V-shaped cross section which are adapted for driving engagement with conventional V belts, not shown. At their inner peripheries, members 8 and 10, respectively, are formed with oppositely directed axially extending annular flanges 16 and 18 terminating in radially inwardly directed peripheral edges 20 and 22. The annular groove 24 formed by flanges 16 and 18 is adapted to embrace the outer race 26 of a ball bearing assembly 28. The inner race 30 of assembly 28 is press-fitted over portion 32 of driven shaft 4 in abutting relation with shoulder 34. Disposed in concentric relation with driving pulley 2 is a clutch housing 36 which is secured thereto by the rivets 12 or other suitable means. Housing 36 is preferably formed of two cooperating sheet metal members 38 and 40. Member 38 is formed with a circular base portion 41 of stepped cross section and an axially forwardly directed annular portion 42. Portion 42 is provided with radially outwardly offset inturned flange 44 of semi-circular cross section at the forward terminal edge thereof. The inner peripheral wall 45 of annular portion 42 is adapted to frictionally, slidably embrace the outer peripheral wall of rearwardly directed annular portion 46 of member 40. The base portion 48 of member 40 is formed with an inclined intermediate dished portion 50 having a central nose portion 52 of reduced diameter. Centrally located in the face 54 of nose portion 52 is a circular aperture 56, the purpose of which will be described presently. To maintain members 38 and 40 in cooperating relation, there is provided a circular snap ring 57 which is adapted for snap-in disposition in inturned flange 44 of member 38. As seen in Figs. 4, 5 and 7, when disposed in position, ring 57 compressibly engages the shoulder 58 of member 40 and thus prevents relative axial movement between members 38 and 40.

Disposed interiorly of the cavity 60 defined by members 38 and 40 is a self-energizing clutch mechanism 6 having a floating pressure plate 62 and a cooperating pressure plate 64 which is splined to a collar 65 keyed to driven shaft 4. As seen in Fig. 4, the central portion of plate 62 is formed with an integral axially forwardly directed annular hub 66 having a radially inwardly turned margin 68 defining a circular aperture 70 which is adapted to surround the intermediate portion 72 of drive shaft 4. As seen best in Fig. 1, the body of hub portion 66 and margin 68 is cut away at spaced intervals to provide arcuate openings 74, while the inner splined periphery 76 of plate 64 is provided with spaced notches 78 (Fig. 4a) arranged in staggered relation with openings 74. In this manner plate 64 may be slidably disposed on collar 65 in a plane bisecting the hub portion 66 of plate 62, as shown. Intermediately of their opposed surfaces 80 and 82, plates 62 and 64 are formed at circumferentially spaced intervals with opposed conical depressions 84 and 86, between which are disposed steel balls 88. To retain balls 88 against radial displacement, a freely rotatable retainer disc 90 is disposed between plates 62 and 64. Disc 90 is provided with flanged openings 92 disposed in radial and circumferential alignment with depressions 84 and 86. Each opening 92 is substantially equivalent in diameter to the diameter of balls 88 and thus prevent radial movement of balls 88 due to centrifugal force incident to rotation of the clutch assembly. Attached to each of the web fingers 94 defined by openings 74 of hub portion 66 is a blade spring 96. The opposite ends 98 of springs 96 yieldably engage the forward face of plate 64 and thereby normally urge the opposed faces of the respective plates together to the position shown in Fig. 4. With plates 62 and 64 in this position, it will be apparent that rotation of pulley 2 will be ineffective to impart rotation to driven shaft 4, since no engagement is effected with clutch housing 36. To effect initial engagement of the clutch mechanism with the clutch housing 36 and thereby accomplish driving engagement between pulley 2 and driven shaft 4, the forward end 100 of shaft 4 is provided with a concentric axial bore 102 in which is slidably disposed an actuating or teaser pin 104. Pin 104 extends outwardly through aperture 46 in nose portion 52 of the clutch housing for engagement by any suitable manual actuator, not shown. Extending transversely through shaft 4 from the forward end thereof to intermediate portion 72 and communicating with bore 102 is a longitudinal slot 106 in which is disposed a square key 108, the opposite ends of which axially abut the inner surface of turned margin 68 of hub 66. A cup-shaped retainer 110 secured on shaft 4 adjacent key 108 prevents lateral displacement of key 108. Upon application of light manual pressure on actuating pin 104, key 108 is displaced axially rearwardly and urges pressure plate 62 into frictional engagement with the rear floating friction ring 112, which, in turn, frictionally engages the forwardly facing inner surface 114 of clutch housing 36. As seen in Fig. 1, pressure plate 62 is free to rotate about shaft 4 within the limits defined by notches 78 of plate 64. Therefore, the drag induced by frictional engagement with the housing 36 causes plate 62 to rotate. Immediately following initial rotation of plate 62, the conical depressions 84 of plate 62 lead or rotate out of circumferential alignment with the depressions 86 of plate 64 which initiates tangential cam action of the balls 88, as seen best in Figs. 2 and 3. This tangential cam action causes relative axial displacement between plates 62 and 64, thus forcing plate 64 to move axially forwardly into frictional engagement with the floating fricton ring 116, which, in turn frictionally engages the rearwardly facing inner surface 118 of housing 36. The resulting torque is then transmitted through plate 64 to driven shaft 4 by means of the splined connection 76, previously mentioned. Upon release of manual pressure on teaser pin 104, frictional engagement between plate 62 and housing 36 is relieved and the tangential cam action of the balls 88 dissipates and springs 96 urge plates 62 and 64 to return to the initial inoperative position shown in Fig. 4. In this connection, it should be noted that while springs 96 tend to assist the return of plates 62 and 64 to inoperative position, tests indicate that release is readily effected without the assistance of springs. Thus, the springs 96 serve principally to regulate the abruptness of release of driving engagement.

In Fig. 6 there is illustrated a modification of the invention wherein initial actuation of the clutch mechanism is effected by centrifugal force acting upon the balls 88. In this modification, the retainer disc 90 is eliminated, thereby permitting the balls 88 to travel radially in the opposed conical depressions 84 and 86. In this embodiment, the drive train is reversed, that is the driven member 4 becomes the driving member while the pulley 2 is the driven member. Therefore, rotation of shaft 4 causes pressure plate 64 to rotate because of the splined connection therebetween. As the speed of rotation of shaft 4 increases, centrifugal force urges the balls 88 radially outwardly in depressions 84 and 86 and thereby urges the respective pressure plates 62 and 64 axially apart. As floating pressure plate 62 effects frictional engagement with friction ring 112, the resultant drag causes driven pressure plate 64 to circumferentially lead pressure plate 62 and institute tangential cam action of the balls 88 in the same manner as previously described. It will, of course, be apparent that no actuator pin is required and accordingly, the aperture 56 in the nose portion of member 40 is closed.

In Fig. 7 there is shown a further modification of the invention wherein the pressure plates 62 and 64 are yieldably urged into frictional engagement with the opposed inner faces of clutch housing 36 by means of a large diameter coil spring 120 which is disposed concentrically of shaft 4 and maintained in compression between an annular sheet metal seat 122 and a second annular seat 124 of generally U-shaped cross section. Seat 122 is secured centrally of pressure plate 62 while seat 124 abuts the annular shoulder portion 126 of collar 65. It will be apparent that spring 120 will normally urge pressure plates 62 and 64 in opposite directions to effect frictional engagement with the respective cooperating friction rings 112 and 116, which, in turn, frictionally engage the adjacent surfaces of clutch housing 36. To accomplish operation corresponding to that of the preferred embodiment, the teaser pin 104 is removed and a pull-type actuating pin 128 is disposed in the bore 102. At its inner end, actuator 128 is provided with a transverse bore 130 adapted for vertical alignment with an axially elongated slot 132 extending transversely through the intermediate portion 72 of driven shaft 4. A second pin 134 extends transversely through slots 132 and bore 130. The opposite ends of pin 134 extend radially outwardly and abut an annular ring 136 disposed against the inner surface of margin 68 of pressure plate hub 66. Retainer ring 136 is provided with a peripheral wall 138 which prevents transverse movement of the pin. To maintain the clutch in the normal inoperative position, actuator pin 128 will normally be pulled axially forward slightly and maintained in the position shown in Fig. 7. Therefore, when it is desired to effect actuation of the clutch, it is only necessary to relieve the pulling pressure on actuator 128 to permit spring 120 to yieldably urge pressure plate 62 into engagement with friction ring 116 and housing 36. After initial frictional engagement of pressure plate 62 with housing 36, the mode of operation of the clutch mechanism is identical to that previously described with reference to the preferred embodiment. A particular advantage of the modification shown in Fig. 7, is the reduction of wear on the actuator pin 128. It will be obvious that during operation of the clutch, the device employed to pull the actuator, not shown, will be out of engagement with the actuator and, therefore, not subject to wear as the result of rotation of the pin. Hence, pin 128 will rotatably contact the operating member only during the relatively short time elapsing after pulling pressure is applied to the pin and the ultimate cessation of rotation of the driven member 4.

From the foregoing it will be seen that a novel and highly versatile clutch construction has been devised. It is particularly important to note that the structure is admirably adapted for fabrication in large part from simple and low cost sheet metal parts.

While several embodiments of the invention have been shown and described, it will be apparent that other changes and modifications may be made therein. It is, therefore, to be understood that it is not intended to limit the invention to the embodiments shown, but only by the scope of the claims which follow.

I claim:

1. A clutch comprising a driven member, a driving member disposed in concentric relation with said driven member and rotatable thereabout, means forming a housing on said driving member, said housing having opposed inwardly facing circular surfaces, a pressure plate disposed within said housing, said pressure plate being keyed to said driven shaft and capable of axial movement thereon, a second pressure plate disposed adjacent said first mentioned plate, said second plate being adapted for rotatable and axial movement relative to said driven shaft, a pair of friction rings disposed interiorly of said housing respectively adjacent said driving surfaces, said rings being normally freely rotatable relative to both said driving surfaces and said pressure plates, an axially movable pin disposed concentrically in said driven shaft, means associated with said pin adapted to engage said second pressure plate to urge said plate into frictional engagement with said friction ring in response to pressure on said pin, means on said plates forming oppositely extending radially and circumferentially aligned pockets, means associated with said pockets adapted to axially urge said first mentioned plate into frictional engagement with the other of said drive surfaces, said last mentioned means being energized by relative circumferential displacement of said pockets.

2. A clutch comprising a driven shaft, a pulley rotatably disposed on said shaft, said pulley being formed of cooperating reversely similar sheet metal members, a sheet metal housing, means simultaneously coupling said members and said housing, said housing being formed with axially spaced inwardly facing driving surfaces a friction member adjacent each of said surfaces, a substantially flat pressure plate disposed interiorly of said housing, said plate being rotatable with and axially movable on said driven shaft, a second pressure plate disposed interiorly of said housing and being rotatable about said shaft and movable into engagement with one of said friction members, a hub portion on said second plate extending through the plane of said first plate, means normally urging said plates together, manual means engageable with said hub portion for moving said second plate, and means energized by relative rotation of said plates for axially urging said first mentioned plate into engagement with the other of said friction members to impart rotation to said driven shaft.

3. A clutch comprising a driven shaft, a pulley rotatably disposed on said shaft, said pulley being formed of cooperating reversely similar sheet metal members, a sheet metal housing, means simultaneously coupling said members and said housing, said housing being formed with axially spaced inwardly facing driving surfaces, a friction member adjacent each of said surfaces, a substantially flat pressure plate disposed interiorly of said housing, said plate being rotatable with and axially movable on said driven shaft, a second pressure plate disposed interiorly of said housing and having a hub portion extending axially through the plane of said first plate, a compression member disposed between said hub portion and said first pressure plate urging said plates together, said second plate being rotatable about said shaft and movable into engagement with one of said friction members, manual means for moving said second plate into frictional engagement with one of said friction members, and means energized by relative rotation of said plate for axially urging said first mentioned plate into engagement with the other of said friction members to impart rotation to said driven shaft.

4. A clutch comprising a driven shaft, a pulley rotatably disposed on said shaft, said pulley being formed of cooperating reversely similar sheet metal members, a sheet metal housing, means simultaneously coupling said members and said housing, said housing being formed with axially spaced inwardly facing driving surfaces, a substantially flat pressure plate disposed interiorly of said housing, said plate being rotatable with and axially movable on said driven shaft, a second pressure plate disposed interiorly of said housing and having a hub portion extending axially through the plane of said first plate, said second plate being rotatable about said shaft and movable into engagement with one of said driving surfaces, resilient means between said hub and said first pressure plate urging said plates axially together, manual means for moving said second plate into frictional engagement with one of said driving surfaces, and means energized by relative rotation of said plate for axially urging said first mentioned plate into engagement with the other of said driving surfaces to impart rotation to said driven shaft.

5. A clutch comprising a driven shaft, a pulley rotatably mounted on said shaft, said pulley being formed of cooperating reversely similar sheet metal members, a sheet metal housing, said housing comprising a pair of telescoping cup-like elements, means for securing said members, and one of said elements in concentric relation, resilient means for retaining the other of said elements in telescoping relation with said first mentioned element, each of said elements having an inwardly facing driving surface formed thereon, a splined collar on said driven shaft, a substantially flat sheet metal pressure plate disposed interiorly of said housing, said plate being provided with a splined inner periphery adapted for sliding cooperation with said splined collar, a second sheet metal pressure plate disposed interiorly of said housing coaxial with said first mentioned plate, said second plate being rotatable about said shaft and movable axially thereof, an integral hub portion on said second plate extending axially through the plane of said first mentioned plate, said hub and said splined inner periphery being alternately notched to permit axial movement therebetween, pressure responsive slidable means for urging said second plate into frictional engagement with one of said driving surfaces, and means energized by relative rotation of said plates for axially urging said first mentioned plate into engagement with the other of said driving surfaces to impart rotation to said driven shaft.

6. The structure defined in claim 5 wherein said resilient means comprises an open ended circular snap ring interengaging said elements.

References Cited in the file of this patent

UNITED STATES PATENTS

| | | |
|---|---|---|
| 1,564,717 | Scruby et al. | Dec. 8, 1925 |
| 2,230,520 | Wemp | Feb. 4, 1941 |
| 2,375,854 | Lambert | May 15, 1945 |
| 2,555,215 | Warner | May 29, 1951 |
| 2,649,941 | Doebeli | Aug. 25, 1953 |
| 2,759,581 | Jacobs | Aug. 21, 1956 |

FOREIGN PATENTS

| | | |
|---|---|---|
| 823,402 | France | Jan. 20, 1938 |